(12) United States Patent
Weddig et al.

(10) Patent No.: US 11,047,760 B2
(45) Date of Patent: Jun. 29, 2021

(54) TANK VENTING SYSTEM FOR A MOTOR VEHICLE AS WELL AS MOTOR VEHICLE AND METHOD FOR OPERATING A TANK VENTING SYSTEM

(71) Applicant: VOLKSWAGEN AKTIENGESELLSCHAFT, Wolfsburg (DE)

(72) Inventors: Silke Weddig, Braunschweig (DE);
Florian Imbt, Braunschweig (DE);
Jens Wodausch, Braunschweig (DE);
Jörg Giere, Burgdorf (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 58 days.

(21) Appl. No.: 15/835,755

(22) Filed: Dec. 8, 2017

(65) Prior Publication Data

US 2018/0164178 A1    Jun. 14, 2018

(30) Foreign Application Priority Data

Dec. 14, 2016   (DE) .......................... 10 2016 225 001

(51) Int. Cl.
*F02M 25/08*     (2006.01)
*G01M 3/04*      (2006.01)
(Continued)

(52) U.S. Cl.
CPC .......... *G01M 3/04* (2013.01); *B60K 15/03519* (2013.01); *F02M 25/0818* (2013.01);
(Continued)

(58) Field of Classification Search
CPC .............. F02D 41/042; F02D 41/0032; F02M 25/0809; F02M 25/0836; F02M 25/089;
(Continued)

(56) References Cited

U.S. PATENT DOCUMENTS 8,590,514 B2 * 11/2013 Pursifull ............. F02D 41/0007
123/520
2004/0129066 A1 * 7/2004 Schulz ............... F02M 25/0818
73/114.41
(Continued)

FOREIGN PATENT DOCUMENTS

DE     196 36 431 A1    3/1998
DE     196 39 116 A1    3/1998
(Continued)

OTHER PUBLICATIONS

Search Report of German Patent Application No. 10 2016 225 001.9, dated May 17, 2017.

*Primary Examiner* — Gonzalo Laguarda
(74) *Attorney, Agent, or Firm* — Pearl Cohen Zedek Latzer Baratz LLP

(57) ABSTRACT

A tank venting system (14) for a motor vehicle (10) has a filter (16) to filter a venting gas (15) of a fuel tank (12) of the motor vehicle (10), a pump (25) to generate a flushing air stream (29) in order to flush the filter (16), and a control unit (30) that, for purposes of performing a leak test, is configured to detect a pressure signal (34) that is dependent on the gas pressure (P) present in the fuel tank (12) and to check whether the pressure signal (34) meets a prescribed leakage criterion (33). The pump (25) is fluidically interconnected between the filter (16) and a shut-off valve (26), whereby the shut-off valve (26) is configured to fluidically couple the pump (25) to an inlet site (27) of a fresh air system (19) of an internal combustion engine (11) of the motor vehicle (10), and whereby the control unit (30) is configured to operate the pump (25) for flushing the filter (16) as well as for performing the leak test.

18 Claims, 2 Drawing Sheets

(51) Int. Cl.
*G01M 3/32* (2006.01)
*B60K 15/035* (2006.01)

(52) U.S. Cl.
CPC ...... *F02M 25/0836* (2013.01); *G01M 3/3272* (2013.01); *B60K 2015/03585* (2013.01); *F02M 25/0872* (2013.01)

(58) Field of Classification Search
CPC  F02M 25/0818; G01M 3/04; B60K 15/03519
See application file for complete search history.

(56) References Cited

U.S. PATENT DOCUMENTS

| | | | |
|---|---|---|---|
| 2006/0283427 A1* | 12/2006 | Koyama | F02D 41/0042 123/519 |
| 2013/0319378 A1* | 12/2013 | Haag | B60K 15/03504 123/519 |
| 2014/0277927 A1* | 9/2014 | Guo | F02M 25/0818 701/34.4 |
| 2015/0159597 A1* | 6/2015 | Woods | F02M 25/089 123/495 |
| 2016/0084175 A1* | 3/2016 | Dudar | F02M 25/0818 123/521 |
| 2017/0152813 A1* | 6/2017 | Casetti | B01D 53/0407 |
| 2017/0211430 A1* | 7/2017 | Zschieschang | F01L 1/3442 |

FOREIGN PATENT DOCUMENTS

| | | |
|---|---|---|
| DE | 100 19 905 A1 | 10/2001 |
| DE | 10 2010 064 239 A1 | 6/2012 |

* cited by examiner

TANK VENTING SYSTEM FOR A MOTOR VEHICLE AS WELL AS MOTOR VEHICLE AND METHOD FOR OPERATING A TANK VENTING SYSTEM

CROSS REFERENCE TO RELATED APPLICATION

This application claims the benefit of German Patent Application No. 10 2016 225 001.9, filed Dec. 14, 2016, which is incorporated by reference in its entirety.

FIELD OF THE INVENTION

The invention relates to a tank venting system and to a motor vehicle. A venting gas that is filtered through a filter can escape from the fuel tank of the motor vehicle via the tank venting system. A pump is provided in order to regenerate or flush the filter. Moreover, the tank venting system can perform a leak test. The invention also includes a method for operating the tank venting system in order to carry out the leak test.

BACKGROUND OF THE INVENTION

In order to be able to use a filter by means of which the venting gas of a fuel tank of the motor vehicle is purified in a tank venting system of the motor vehicle and which is a part that does not have to be replaced when the car is serviced, so-called flushing of the filter can be carried out, a process in which air flows through the filter.

German patent applications DE 100 19 905 A1 and DE 196 36 431 A1 disclose installing a pump between an air inlet for ambient air and the filter so that this pump can build up excess pressure in the tank venting system in order to perform a leak test. The filter is flushed passively by using the negative pressure that is present in a fresh air system of an internal combustion engine.

The tank venting system known from the state of the art has the drawback that, during normal operation, the venting of the fuel tank is dependent on the so-called fresh air system being large enough to exhaust the venting gas through the filter. Due to its design, the pump cannot be employed for this purpose.

SUMMARY OF THE INVENTION

The invention is based on the objective of putting forward a tank venting system with an automated leak test and flushing function for the filter of the venting gas for a motor vehicle.

This objective is achieved by the subject matters of the independent patent claims. Advantageous refinements of the invention are described in the dependent patent claims, in the description below as well as in the figures.

The tank venting system according to the invention comprises the described filter to filter the venting gas of the fuel tank of the motor vehicle as well as a pump to generate a flushing air stream in order to flush the filter. The venting gas can be a dispersion consisting of air and fuel gas (for example, evaporated gasoline or evaporated diesel). A control unit of the tank venting system is configured to detect a pressure signal that serves for the likewise provided leak test and that is dependent on the gas pressure present in the fuel tank. The control unit is configured to check whether this pressure signal meets a prescribed leakage criterion. If the leakage criterion has been met, the control unit generates a fault signal. In other words, the pump or another diagnosis pump can be employed to generate a gas pressure in the fuel tank, that is to say, an excess pressure or a negative pressure in comparison to the ambient pressure. During the leak test, the control unit receives the pressure signal and checks how the gas pressure changes over time during the pressure build-up and/or relief. The leakage criterion defines from which point onwards this time course of the gas pressure constitutes an indication of a leakage or a leak in the tank venting system and/or in the fuel tank.

According to the invention, a pump is provided at a place in the tank venting system that had not been utilized up until now. The pump is, in fact, configured so that it is fluidically interconnected between the filter and a shut-off valve that is configured to fluidically couple the pump to an inlet site of the fresh air system of the internal combustion engine of the motor vehicle. In other words, the filter, the pump and the shut-off valve are each connected via a channel (tube or hose). The shut-off valve is connected to the fresh air system of the internal combustion engine either directly or else via another channel. Therefore, the pump is not arranged separately or apart from the connection between the filter and the internal combustion engine, as is provided for in the state of the art. Rather, the venting gas exiting the filter flows through the pump to the shut-off valve and from there into the internal combustion engine. In this manner, the pump itself is employed to convey the venting gas. However, especially according to the invention, the control unit is configured to operate the pump for flushing the filter as well as for performing the leak test. Therefore, the invention puts forward a new installation site for the pump and can make use of this pump for three applications, namely, to convey the venting gas from the filter to the internal combustion engine, to flush the filter and to perform the leak test.

The invention also encompasses optional additional features which yield additional advantages.

The pump can be, for instance, a flow pump. A refinement, however, provides that the pump is a displacement pump, and the control unit is configured so that, during the leak test, it is not utilized to convey a gas flow, at least at times, but rather, to operate at a neutral speed which is indeed greater than 0 but less than an operating speed prescribed for conveying the flushing air stream, so that, at this neutral speed, a gas flow being conveyed by the pump has no effect on the pressure signal. In other words, the pump rotates at a neutral speed which, in one range can be greater than 0 and, for instance, less than 1000 rpm, or else less than 50% of the operating speed. If the speed is less than the operating speed prescribed for conveying the flushing air stream but is nevertheless still greater than 0, the pump at the neutral speed loses its sealing effect between the shut-off valve and the filter. This measure is particularly effective for those cases where the pump is a rotary vane pump. In the case of a rotary vane pump, the neutral speed results, for example, from the fact that the vanes are only extended partially, in other words, not completely. If the pump is rotating slowly, it neither conveys any noteworthy quantity of gas nor does it have a sealing effect. Consequently, the pressure can be equalized on both sides of the pump and all the way through it. In this manner, the leak test detects both sides of pump. By operating the pump at the neutral speed during the leak test, it is thus possible to detect a leak that is present in the channel of the tank venting system and that is located between the pump and the shut-off valve. This measurement can be made all the way through the pump by means of a pressure sensor or another apparatus provided for the diagnosis of the tank venting system since, at the neutral speed, the pump loses or does not display its sealing effect.

Since the leak test is now possible all the way through the pump, also for the section of the channel located between the pump and the shut-off valve, another advantage can be provided in that the pump and the shut-off valve are connected via a connecting line configured so that it can be disconnected reversibly and non-destructively. In other words, this section of the channel of the tank venting system is provided with a connecting line that can be opened or replaced. This allows repairs to be made to this section or area of the tank venting system. This is not a given since, if the leak test were not to extend all the way to this area, this area would have to be configured so as to be sealed during the manufacture of the motor vehicle so that it cannot be opened during repair work and, for example, inadvertently left open. Only the certainty or guarantee that the pump can check the tightness makes it possible to configure the connecting line so that it can be disconnected reversibly and non-destructively.

When it comes to the leak test, it is not necessary to operate continuously at the neutral speed during the entire leak test. This situation can also be present at times, that is to say, during part of the leak test. In fact, it is also possible to configure the control unit to operate the pump in such a way that, during the leak test, at least at times, the pump itself generates the gas pressure. In other words, the pump can be used to build up an excess pressure or a negative pressure. For this purpose, the shut-off valve can be opened, the gas pressure can be built up via the fresh air system and the shut-off valve can then be closed. During this time and/or subsequently, it can be checked on the basis of the pressure signal whether a time course of the gas pressure meets the above-mentioned leakage criterion.

Since the pump is situated between the filter and the shut-off valve and thus between the filter and the inlet site of the fresh air system, in order to generate the gas pressure, the pump should preferably be configured to reverse the direction of rotation as compared to the direction of rotation specified or set for the flushing air stream. In this manner, the flushing air stream can be suctioned off by the filter and conveyed to the fresh air system of the internal combustion engine (filter operation) and, conversely, an air stream can flow from the fresh air system to the filter (leak test) in order to build up the gas pressure (here an excess pressure). As an alternative to reversing the direction of rotation, it can be provided that a switch-over valve is employed to reverse the gas flow being conveyed by the pump. As another alternative to reversing the flow direction, a leak test by means of negative pressure can be provided. This requires neither a reversal of the conveying direction of the pump nor a switch-over valve.

As already elaborated upon, the pressure signal can be generated by a pressure sensor of the tank venting system. In this case, the control unit is preferably configured in such a way that the leakage criterion entails that a pressure build-up curve displays a prescribed time course during the pumping or suctioning off required to generate the gas pressure and/or in such a way that a pressure change in the gas pressure displays a prescribed time course after the end of this conveying procedure for generating the gas pressure and after the shut-off valve has been blocked. A leak or leakage having a diameter of 0.5 mm, for example, can be detected by means of this method.

The invention also encompasses a motor vehicle with the fuel tank and an internal combustion engine having the above-mentioned fresh air system. The motor vehicle according to the invention is characterized by an embodiment of the tank venting system according to the invention. The motor vehicle according to the invention is preferably configured as a vehicle, especially a passenger car or a truck.

Finally, the invention also encompasses a method for operating the tank venting system according to the invention. The method relates to the leak test. A pump of the tank venting system is operated during this leak test. This pump is fluidically interconnected between the filter of the tank venting system and the shut-off valve in the manner described above, said valve being connected to said inlet site of the fresh air system of the internal combustion engine of the motor vehicle. In this context, the pump is operated, at least at times, at a neutral speed (not equal to 0) that is too low to convey gas. In addition or as an alternative to this, it can be provided that, during the leak test, the pump is operated, at least at times, in order to generate the gas pressure so as to detect a leak in the tank venting system. In other words, the sealing or blocking effect of the pump can be eliminated by means of the neutral speed, without a gas flow created in this process influencing or altering the pressure signal of the pressure sensor. In addition or as an alternative to this, the pump can be operated in order to provide the gas pressure at which the leak test to detect the leakage is carried out. Said inlet site of the fresh air system is preferably situated upstream from a turbocharger of the motor vehicle. The advantage of this inlet site is that, during operation turbocharged by the engine, there is no need to overcome an additional excess pressure that can be present at times at the position downstream from the turbocharger and/or from the throttle valve. In the case of engines without turbocharging, the inlet site can also be located at a different place in the intake system, for example, downstream from the throttle valve.

The invention also comprises refinements of the method according to the invention which contain features of the type already described in conjunction with the refinements of the tank venting system according to the invention. For this reason, the corresponding refinements of the method according to the invention are not described once again here.

BRIEF DESCRIPTION OF THE DRAWINGS

An embodiment of the invention is described below. In this context, the following is shown.

Figure 1:
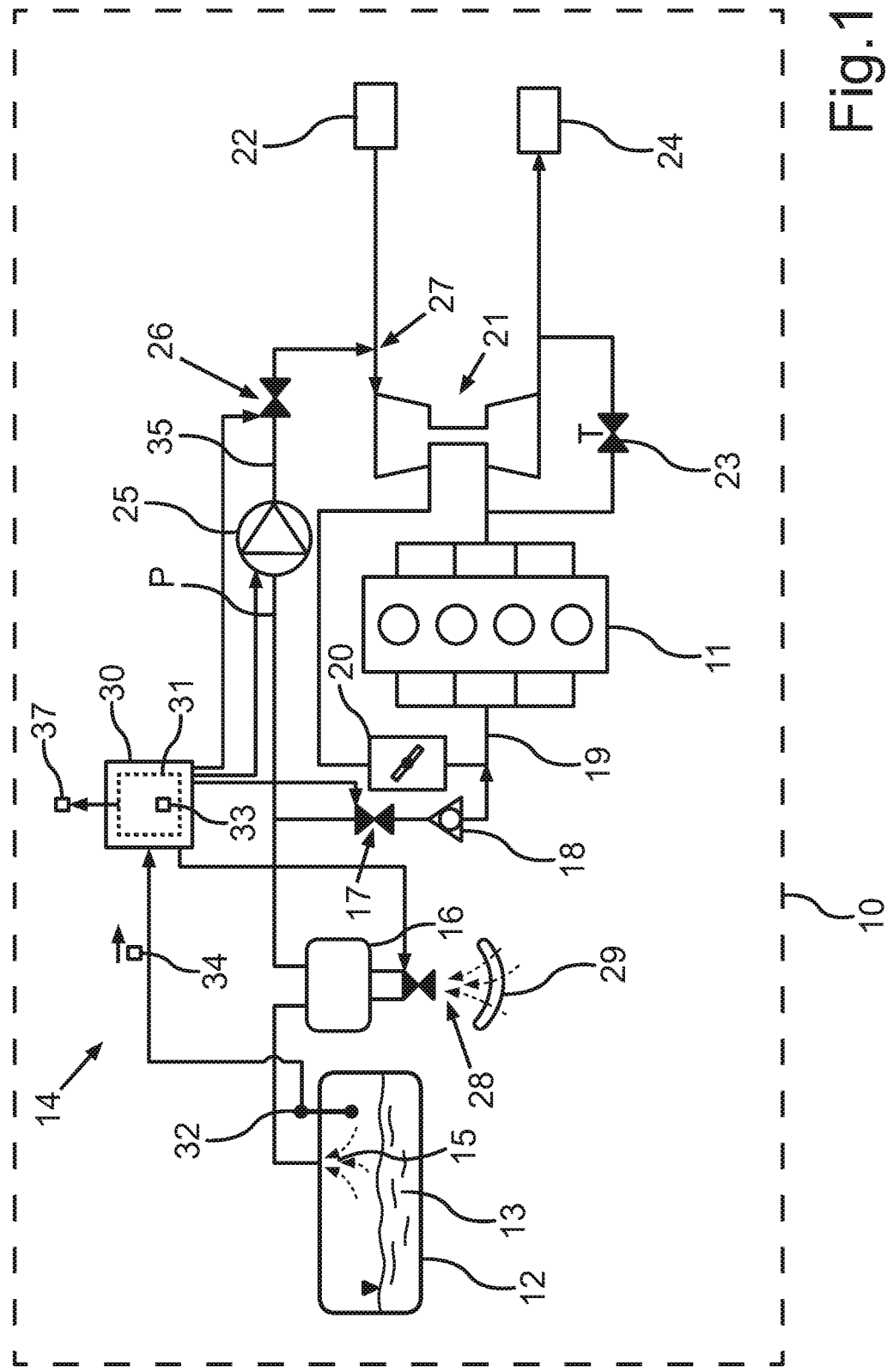
FIG. 1 is a schematic view of a first embodiment of the motor vehicle according to the invention.

The embodiment elucidated below relates to a preferred configuration of the invention. In the embodiment, the described components of the configuration each constitute individual features of the invention which are to be considered independently of each other and which refine the invention likewise independently of each other, and which therefore are also to be considered as part of the invention, either individually or else in a combination different from the one shown. Moreover, the described embodiment can also be augmented by additional features of the invention already described.

In the figures, functionally identical elements are designated by the same reference numerals.

DETAILED DESCRIPTION OF THE INVENTION

FIG. 1 shows a motor vehicle 10 which can be, for instance, a motor vehicle, especially a passenger car or a truck. The motor vehicle 10 can have an internal combustion engine 11 which can be, for example, a diesel engine or an Otto engine. A fuel 13 (e.g. diesel or gasoline) can have been filled into a fuel tank 12 for the operation of the internal combustion engine 11. The fuel tank 12 can be vented via a tank venting system 14, that is to say, evaporated fuel 13 can be discharged from the fuel tank 12 via the tank venting system 14 so that a pressure build-up or excess pressure in the fuel tank 12 can be prevented. The air containing the evaporated fuel constitutes a venting gas 15 which can be released or conveyed into a fresh air system 19 of the internal combustion engine 11 after having passed through a filter 16, for example, an activated carbon filter, as well as via a tank venting valve 17 and a non-return valve 18. Moreover, a throttle valve 20 and a turbocharger 21 are shown in conjunction with the fresh air system 19. The internal combustion engine 11 can draw in ambient air from an air filter 22 via the fresh air system 19. Exhaust gas of the internal combustion engine 11 can be conveyed to an exhaust-gas system 24 in a known manner via the turbocharger 21 or alternatively via a bypass 23.

In order to flush the filter 16, gas exiting from the filter 16 can be conveyed to a shut-off valve 26 via a pump or flushing pump 25, independently of the tank venting valve 14. The shut-off valve 26 is connected to the fresh air system 19 at an inlet site 27. The inlet site 27 can be installed upstream from the turbocharger 21.

FIG. 1 shows an embodiment in which the filter 16 can have a shut-off valve 28 which can be open so that, for a flushing operation, the pump 25 can convey a flushing air stream 29 through the shut-off valve 28 and through the filter 16 to the open shut-off valve 26, from where the flushing air stream 29 flows into the fresh air system 19 at the inlet site 27. The flushing air stream 29 flushes or purifies or regenerates the filter 16 in a familiar manner. In this process, the pump 25 can be operated at an operating speed that conveys the flushing air stream 29. The shut-off valves 26, 28 and the pump 25 can be controlled by a control unit 30 which, for this purpose, can have a processor unit 31.

In order to perform a leak test of the tank venting system 14, the shut-off valve 28 can be closed and the flushing pump 25 can build up a gas pressure P in the tank venting system 14 via the open shut-off valve 26. For example, during this time and/or after the shut-off valve 26 has been closed, the control unit 30 can monitor the course of the gas pressure P over time by means of a pressure sensor 32. The course can be compared to a leakage criterion 33 which defines from which point onwards this course constitutes an indication of a leak or leakage in the tank venting system 14 and/or in the fuel tank 12. Such a leakage criterion can be determined on the basis of simple experiments. The pressure sensor 32 can be installed, for example, in the fuel tank 12. The pressure sensor 32 can emit a sensor signal 34 to the control unit 30 and, on the basis of this signal, the time course of the gas pressure P can be observed or determined by the control unit 30.

The flushing pump 25 can be a flow pump. However, if the flushing pump is a displacement pump, especially a rotary vane pump, then, during the measurement of the gas pressure P, the flushing pump 25 can be operated on the basis of the pressure signal 34 at a neutral speed which is less than said operating speed, especially less than 50%, preferably less than 40%, of the operating speed, but greater than 0. In this way, a change in the gas pressure P can be detected by means of the pressure sensor 32, also in a connecting channel or in a connecting line 35 between the flushing pump 25 and the shut-off valve 26, since the flushing pump 25 loses its sealing or sealing-off effect at the neutral speed, without itself building up or bringing about a pressure differential or at least a significant pressure differential that could have an effect on the pressure signal 34.

Figure 2:
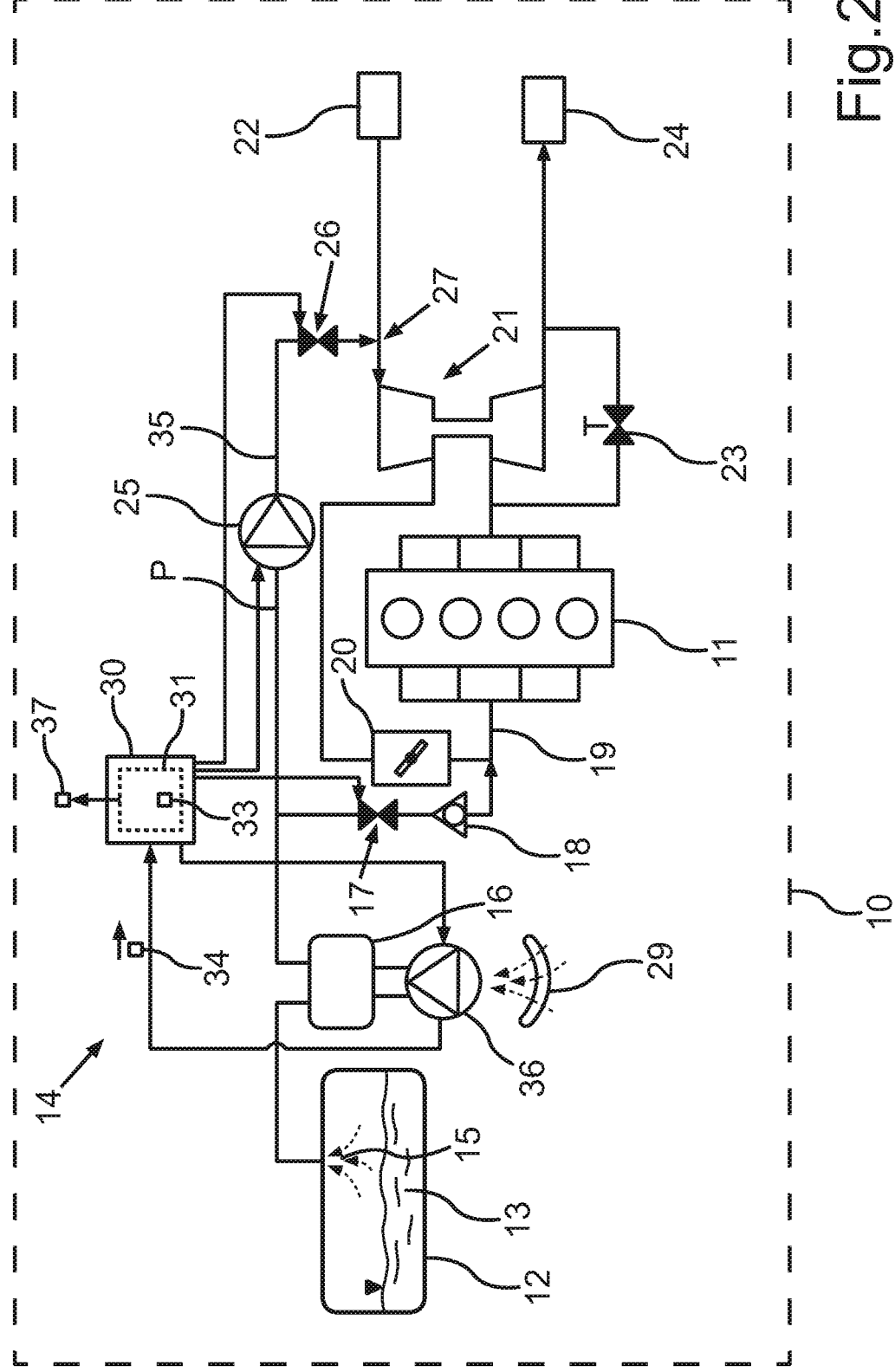
FIG. 2 is a schematic view of a second embodiment of the motor vehicle according to the invention.

FIG. 2 shows an embodiment in which, instead of the shut-off valve 28 on the filter 16, there is an additional diagnosis pump 36 with which the gas pressure P can be generated. The diagnosis pump 36 can be part of a tank-leakage diagnostic module which can also generate the pressure signal 34. FIG. 2 shows a diagnosis pump 36 that can generate an excess pressure as the gas pressure P. It is also possible to provide a suction pump that can generate a negative pressure as the gas pressure P with respect to the ambient pressure. In other words, the implementation is independent of whether the described diagnosis of the tank tightness is going to be carried out with excess pressure or with negative pressure. The tank-leakage diagnostic module can also evacuate the system.

If the leakage criterion 33 has been met, a fault signal 37 can be generated. Therefore, the leakage criterion 33 can entail, for instance, that a pressure build-up or relief has to display a prescribed change over time, that is to say, a pressure gradient, in order for the leakage criterion 33 to have been met.

Specific embodiments of the method for leak testing will described once again below.

For purposes of the tank-tightness diagnosis or leak test, the tank venting system 14 is closed at the filter 16 by the tank-leakage diagnostic module. Moreover, the tank venting valve 17 and the shut-off valve 26 are closed downstream from the flushing pump 25, especially the rotary vane pump. During the active leak testing, the rotary vane pump is then operated at the low speed (neutral speed). Due to the low centrifugal forces, a rotary vane pump then conveys a small volume flow or gas flow but, in exchange for that, the sealing effect is eliminated so that the pressure between the connecting line 35 and the filter 16 can be equalized. As a result, the air space between the shut-off valve 26 and the rotary vane pump (flushing pump 25) can likewise be checked for leaks, whereby detection is possible down to a leakage size of 0.5 mm.

In an advantageous manner, the connections between a pump 25 and the shut-off valve 26 can also be constructed so as to be detachable since now the tightness can be checked. Otherwise, the connections would have to be constructed so as to be undetachable. Detachable connections, however, are more maintenance-friendly and reduce the complexity of the components.

Therefore, with a combination of the tank venting system with a rotary vane pump, the rotary vane pump can be operated during the leak test at a lower neutral speed than the operating speed specified for the pump operation in order to achieve a pressure equalization beyond the rotary vane pump. The centrifugal forces at the neutral speed of the rotary vane pump are not sufficient to close off the conveying chambers. The sealing effect of the rotary vane pump is thus eliminated.

A diagnostic module having its own diagnosis pump 36 can also be completely dispensed with by using the pump 25 for the regeneration of the filter 16 as well as for the diagnosis or leak test, that is to say, in order to generate the gas pressure P. The pressure charge needed to generate the gas pressure P can come from the fresh air system 19 at the inlet site 27 of the internal combustion engine 11 instead of coming from the ambient air. This also prevents icing of components of the tank venting system 14 during the leak test.

If a pump 25 is used with which no reversal of the direction is possible, a switch-over valve (not shown here) can be employed between the pump and the air filter. In this case, the switch-over valve allows a reversal of the air flow direction.

For the diagnosis, the shut-off valve 28 at the filter 16 and the tank venting valve 17 are closed and the shut-off valve 26 is opened upstream from the pump 25. The pump 25 conveys air from the air filter 16 into the fuel tank 22 counter to the regeneration direction. The reversal of the conveying direction can be effectuated either by reversing the direction of rotation of the pump 25 or else by installing a separate switch-over valve between the pump 25 and the filter 16 (not shown in the figure). As an alternative to this, the air can be conveyed in the regeneration direction, thereby generating a negative pressure for the diagnosis.

By means of a pressure sensor 32 in the tank system, a conclusion can be drawn about the tightness of or leaks in the tank system consisting of the fuel tank 12 and the tank venting system 14. This can be done either on the basis of the course of the pressure build-up curve during the build-up or relief by the pump or else on the basis of the pressure drop after the conveying procedure has ended and the shut-off valve 26 between the pump 25 and the filter 16 has been blocked.

Therefore, the core element of the tank venting system 14 is a pump 25 situated between the filter 16 (activated carbon container) and the second inlet site 27 upstream from the exhaust-gas turbocharger 21. The pump 25 is thus arranged fluidically between the activated carbon container 16 and the regeneration valve (tank venting valve 26). First and foremost, the pump 25 has the function of regenerating the activated carbon container 16. The dual utilization of the pump 25 is characterized by its use for the leak test or leak diagnosis of the tank system as well as for the regeneration of the activated carbon container 16. Moreover, a simple shut-off valve 26 can be used as the tank venting valve between the activated-coal container 16, the pump 25 and the internal combustion engine 11.

All in all, the example shows how the invention allows a tank leakage diagnosis to be carried out by means of the tank venting pump that is integrated in the regeneration line.

LIST OF REFERENCE NUMERALS 10 motor vehicle
11 internal combustion engine
12 fuel tank
13 fuel
14 tank venting system
15 venting gas
16 filter
17 tank venting valve
18 non-return valve
19 fresh air system
20 throttle valve
21 turbocharger
22 air filter
23 bypass
24 exhaust-gas installation
25 pump
26 shut-off valve
27 inlet opening
28 shut-off valve
29 flushing stream
30 control unit
31 processor unit
32 pressure sensor
33 leakage criterion
34 pressure signal
35 connecting line
36 diagnosis pump
37 fault signal

The invention claimed is:

1. A tank venting system for a motor vehicle, comprising
a filter configured to filter a venting gas of a fuel tank of the motor vehicle,
a pump configured to generate a flushing air stream in order to flush the filter,
a control unit comprising a processor that, for purposes of performing a leak test, is configured to detect a pressure signal that is dependent on the gas pressure present in the fuel tank and to check whether the pressure signal meets a prescribed leakage criterion and, if the leakage criterion has been met, to generate a fault signal,
a tank venting valve, and
a non-return valve,
wherein the pump, the filter and a shut-off valve are each connected via a first channel, and the pump is located in the first channel between the filter and the shut-off valve,
wherein the tank venting valve is located in a second channel which:
branches off from a section of the first channel that is located between the filter and the pump, and
is connected to a fresh air system of an internal combustion engine of the motor vehicle,
wherein the non-return valve is located in the second channel downstream from the tank venting valve,
wherein the shut-off valve is configured to fluidically couple the pump to an inlet site of the fresh air system, and
wherein the processor is configured to operate the pump for flushing the filter as well as for performing the leak test.

2. The tank venting system according to claim 1, wherein:
the pump is a displacement pump, and
the processor is configured so that, during the leak test, at least at times, the processor operates the pump at a neutral speed which is greater than 0 but less than an operating speed which is prescribed for conveying the flushing air stream and at which a gas flow being conveyed by the pump has no effect on the pressure signal and at which the pump loses its sealing effect between the shut-off valve and the filter.

3. The tank venting system according to claim 2, wherein the pump is a rotary vane pump.

4. The tank venting system according to claim 2, wherein the pump and the shut-off valve are connected via a connecting line that is configured so that it can be disconnected reversibly and non-destructively.

5. The tank venting system according to claim 1, wherein the processor is configured so that, during the leak test, it operates the pump, at least at times, in order to generate the gas pressure.

6. The tank venting system according to claim 4, wherein, in order to generate the gas pressure, the pump is configured to reverse the direction of rotation as compared to the direction of rotation set for the flushing air stream, or else to reverse a conveyed gas flow by means of a switch-over valve.

7. The tank venting system according to claim 1, wherein the processor is configured to receive the pressure signal from a pressure sensor of the tank ventilation system, whereby the leakage criterion entails that a pressure build-up curve displays a prescribed time course during the conveying operation to generate the gas pressure by means of pumping or suctioning-off and/or a pressure change displays a prescribed time course after the end of this conveying operation and after the shut-off valve has been blocked.

8. A motor vehicle comprising:
the tank venting system according to claim 1.

9. A method for operating a tank venting system in a motor vehicle,
the tank venting system comprising a filter to filter a venting gas of a fuel tank of the motor vehicle, a pump to generate a flushing air stream in order to flush the filter, a tank venting valve, a non-return valve and a control unit comprising a processor that, for purposes of performing a leak test, is configured to detect a pressure signal that is dependent on the gas pressure present in the fuel tank and to check whether the pressure signal meets a prescribed leakage criterion and, if the leakage criterion has been met, to generate a fault signal, wherein the pump, the filter and a shut-off valve are each connected via a first channel, and the pump is located in the first channel between the filter and the shut-off valve,
wherein the tank venting valve is located in a second channel which:
    branches off from a section of the first channel that is located between the filter and the pump, and
    is connected to a fresh air system of an internal combustion engine of the motor vehicle,
wherein the non-return valve is located in the second channel downstream from the tank venting valve,
wherein the shut-off valve is configured to fluidically couple the pump to an inlet site of the fresh air system, and wherein the control unit is configured to operate the pump for flushing the filter as well as performing the leak test,
the method comprising:
    operating, during a leak test, the pump of the tank venting system; and
    operating the pump, at least at times, at a neutral speed not equal to 0 that is too low to convey gas, and/or, at least at times, in order to generate a gas pressure to detect a leak in the tank venting system.

10. A tank venting system for a motor vehicle, comprising
a filter configured to filter a venting gas of a fuel tank of the motor vehicle,
a first pump configured to generate a flushing air stream in order to flush the filter, and
a control unit comprising a processor that, for purposes of performing a leak test, is configured to detect a pressure signal that is dependent on the gas pressure present in the fuel tank and to check whether the pressure signal meets a prescribed leakage criterion and, if the leakage criterion has been met, to generate a fault signal,
a tank venting valve,
a non-return valve, and
a second pump attached to the filter, the second pump configured to generate a positive pressure in the fuel tank for the leak test,
wherein the first pump, the filter and a shut-off valve are each connected via a first channel, and the pump is located in the first channel between the filter and the shut-off valve,
wherein the tank venting valve is located in a second channel which:
    branches off from a section of the first channel that is located between the filter and the first pump, and
    is connected to a fresh air system of an internal combustion engine of the motor vehicle,
wherein the non-return valve is located in the second channel downstream from the tank venting valve,
wherein the shut-off valve is configured to fluidically couple the first pump to an inlet site of a fresh air system of an internal combustion engine of the motor vehicle, and
wherein the processor is configured to operate the first pump for flushing the filter and either the first pump or the second pump for performing the leak test.

11. The tank venting system according to claim 10, wherein:
the first pump is a displacement pump, and
the processor is configured so that, during the leak test, at least at times, the processor operates the first pump at a neutral speed which is greater than 0 but less than an operating speed which is prescribed for conveying the flushing air stream and at which a gas flow being conveyed by the first pump has no effect on the pressure signal and at which the first pump loses its sealing effect between the shut-off valve and the filter.

12. The tank venting system according to claim 11, wherein the first pump is a rotary vane pump.

13. The tank venting system according to claim 11, wherein the first pump and the shut-off valve are connected via a connecting line that is configured so that it can be disconnected reversibly and non-destructively.

14. The tank venting system according to claim 13, wherein, in order to generate the gas pressure, the first pump is configured to reverse the direction of rotation as compared to the direction of rotation set for the flushing air stream, or else to reverse a conveyed gas flow by means of a switch-over valve.

15. The tank venting system according to claim 10, wherein the processor is configured so that, during the leak test, it operates the first pump, at least at times, in order to generate the gas pressure.

16. The tank venting system according to claim 10, wherein the processor is configured to receive the pressure signal from a pressure sensor of the tank ventilation system, whereby the leakage criterion entails that a pressure build-up curve displays a prescribed time course during the conveying operation to generate the gas pressure by means of pumping or suctioning-off and/or a pressure change displays a prescribed time course after the end of this conveying operation and after the shut-off valve has been blocked.

17. A motor vehicle comprising:
the tank venting system according to claim 10.

18. A tank venting system for a motor vehicle, comprising
a filter configured to filter a venting gas of a fuel tank of the motor vehicle,
a pump configured to generate a flushing air stream in order to flush the filter,
a control unit comprising a processor that, for purposes of performing a leak test, is configured to detect a pressure signal that is dependent on the gas pressure present in the fuel tank and to check whether the pressure signal meets a prescribed leakage criterion and, if the leakage criterion has been met, to generate a fault signal, and
a tank venting valve,
wherein the pump, the filter and a shut-off valve are each connected via a first channel, and the pump is located in the first channel between the filter and the shut-off valve, wherein the tank venting valve is located in a second channel which:
  branches off from a section of the first channel that is located between the filter and the pump, and
  is connected to a fresh air system of an internal combustion engine of the motor vehicle,
wherein the shut-off valve is configured to fluidically couple the pump to an inlet site of the fresh air system, and
wherein the processor is configured to:
  operate the pump for flushing the filter as well as for performing the leak test, and
  during the leak test, at least at times, the processor operates the pump at a neutral speed which is greater than 0 but less than an operating speed which is prescribed for conveying the flushing air stream and at which a gas flow being conveyed by the pump has no effect on the pressure signal and at which the loses its sealing effect between the shut- off valve and the filter.

* * * * *